Sept. 21, 1965 W. B. CARRUTH ETAL 3,207,999

DIRECT COUPLED TRANSISTOR AMPLIFIER INCLUDING FEEDBACK AND TEMPERATURE RESPONSIVE MEANS

Filed Aug. 21, 1961

INVENTOR.
WINFORD B. CARRUTH.
MICHAEL SLAVIN.
PETER S. MANSON.
BY
Dillman, Smith & Lamb
ATTORNEY.

United States Patent Office 3,207,999
Patented Sept. 21, 1965

3,207,999

DIRECT COUPLED TRANSISTOR AMPLIFIER INCLUDING FEEDBACK AND TEMPERATURE RESPONSIVE MEANS

Winford B. Carruth and Michael Slavin, Baltimore, and Peter S. Manson, Glenarm, Md., assignors to The Bendix Corporation, Towson, Md., a corporation of Delaware Filed Aug. 21, 1961, Ser. No. 132,751
2 Claims. (Cl. 330—17)

Figure 1:
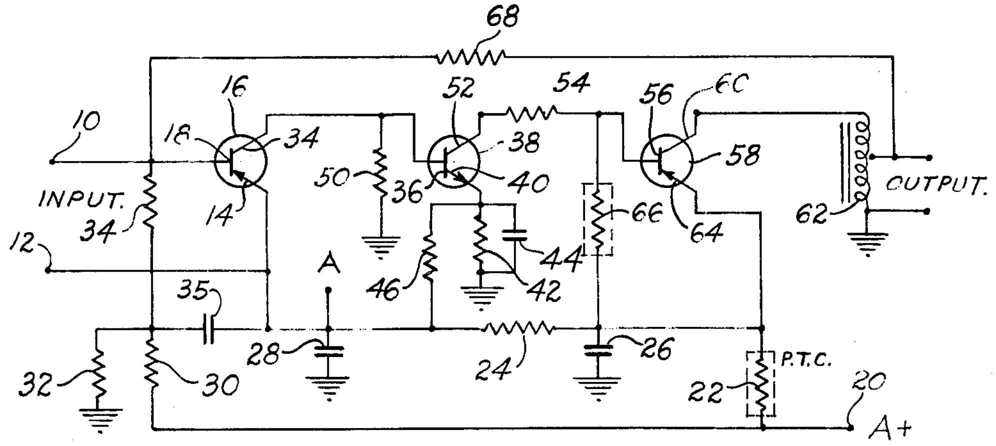

This invention relates to amplifiers and, more particularly, to a direct coupled transistor amplifier having especial utility for use in automobile radios.

Amplifiers for use with automobile radios present a number of problems to the designer brought about by the need to balance performance under the environmental conditions encountered against costs. Transistor amplifiers have proved to have considerable utility in the automobile radio field because of their advantages of low power drain and mechanical ruggedness. They do, however, introduce specific problems of their own, largely because of the low input impedances and because of a greater tendency to change their output currents with temperature changes and power supply variations than are normally experienced with vacuum tubes. With these characteristics in mind, it is apparent that the necessary use of a direct current power source having a considerable high frequency alternating current component makes effective filtering of the power supply a major consideration. Yet these problems must be met within the framework of reasonable costs. Every large or heavy component that can be eliminated reduces costs and makes possible smaller radio packages with greater flexibility as to installation. One major component which it has been desired to eliminate is the interstage transformer normally used to drive the output transistor. In addition to its physical size, this transformer may be responsible for contributing to the amount of power line noise introduced into the output circuit. Another such component which it is desirable to eliminate is the usual power line choke normally required to attenuate ignition noises. The current bias potentiometer which has often been used for controlling current levels in the amplifier is also a large component which introduces reliability problems and which designers would like to eliminate. Some manufacturers avoid the use of this potentiometer by using a bias resistor especially selected to be used in association with a specific transistor. By limiting the specifications of these components as required to provide the desired matching characteristics, the physical size of the bias potentiometer is avoided but costs are introduced which cancel much of the advantage of eliminating the bias potentiometer. It is therefore an object of the present invention to provide a high quality transistor amplifier suitable for use in an automobile radio in which all interstage transformers are eliminated as well as the power line choke.

It is another object of the present invention to provide a transistor amplifier meeting the above object in which the typical bias potentiometer is eliminated or the necessity for matching a bias resistor with the characteristics of the appropriate transistor is avoided.

It is another object of the present invention to provide a transistor amplifier meeting the above objectives and including temperature compensating means for maintaining the desired collector current levels.

It is a further object of the present invention to provide a transistor amplifier having the required audio gain and performance which can be manufactured easily and at very low cost.

It is a further object of the present invention to provide a transistor amplifier having the required gain and performance which can be manufactured in a package of very small physical dimensions.

Figure 2:
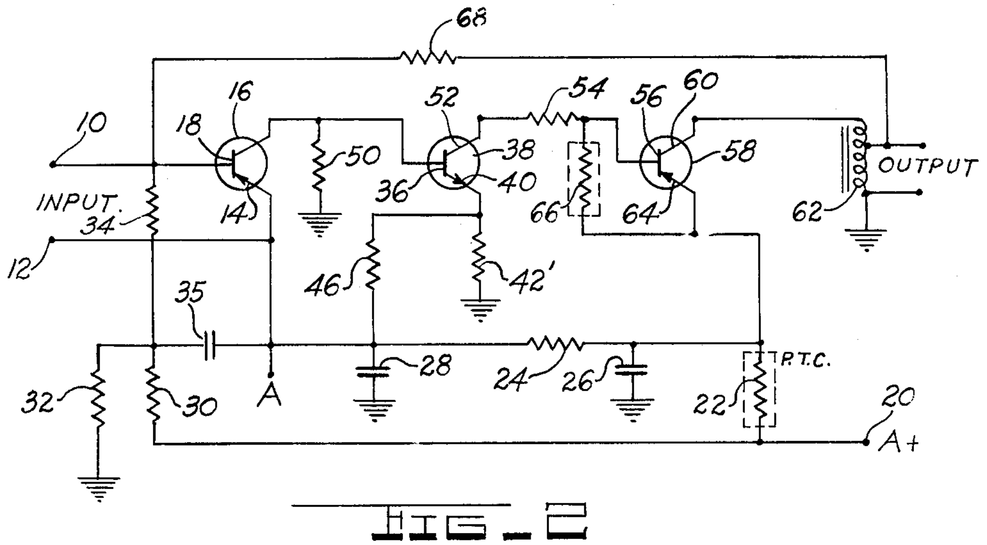

Other objects and advantages will become apparent from the following specification taken in connection with the accompanying drawing in which:

FIGURE 1 is a schematic drawing of an amplifier made according to our invention; and FIGURE 2 is a schematic drawing of our alternative form of our invention.

Referring to FIGURE 1, an input signal is connected to the input terminals 10 and 12. Terminal 12 is connected to the emitter 14 of a transistor 16 and terminal 10 to the base 18 of said transistor. Emitter 14 is connected to the power source (A+ line) at terminal 20 through resistors 22 and 24. When the amplifier is used in an automobile radio, the power source, which is typically about 12 volts D.C., inevitably contains a substantial alternating current component as a result of the operation of the ignition system. Typically, it has been necessary to install a comparatively large and heavy choke coil in the A+ line in order to attenuate these alternating currents. In the present amplifier, it has been found possible to provide adequate power supply filtering to the emitter 14 and preceding stages by means of resistors 22 and 24 in combination with by-pass capacitors 26 and 28. Preceding stages are powered from terminal A. Resistor 22, having a positive temperature coefficient, is a self-heating type and its effect will be described in detail below. A resistor 30, also effectively connected to the power terminal 20, acts in conjunction with resistors 32 and 34 to establish the bias on transistor 16. This is unfiltered power supply current connected to resistor 30 and, in order to remove noise or "purr" from the system, a capacitor 35 is connected between resistor 30 and the emitter 14. Capacitor 35 also prevents audio frequencies from subsequent stages from circulating in the base-emitter circuit of transistor 16.

The collector of transistor 16 is connected to the base 36 of an NPN transistor 38.

The emitter 40 of this transistor is connected to ground through a resistor 42 by-passed by means of a capacitor 44. A resistor 46 is effectively connected between the filtered power terminal A and emitter 40 to provide the desired voltage level at the emitter 40. A resistor 50, connected between base 36 and ground, contributes to establishing the bias on this stage.

The collector 52 of transistor 38 is connected through a current-limiting resistor 54 to the base 56 of a PNP transistor 58, which is the output transistor of the amplifier. The collector 60 supplies the output of the amplifier to an inductive load consisting of a coil 62 connected between collector 60 and ground. The emitter 64 of transistor 58 is connected directly to the special resistor 22. A resistor 66, which is typically a thermistor, operates to establish the bias on base 56 and tends to stabilize the direct current flow in the system with temperature.

Over-all negative feedback is provided by means of a resistor 68 connected to feed a portion of the output appearing in the coil 62 back to the base 18 of transistor 16.

With the circuit as described, the output current is established by means of the voltage drop across resistor 22 and the resistances of resistors 30, 32, and 34. A change in output current produces a change in the voltage drop across resistor 22, which change is opposed by the large direct current gain in the feedback loop. Additional direct current gain is realized in the circuit by making resistor 22 a self-heating resistor such that anything which would tend to cause excessive currents to be drawn through resistor 22 will cause it to heat up, thus increasing its resistance and reducing the current flow there-through. Resistor 22 and capacitor 26 and resistor 24 and capacitor 28 constitute filter sections providing attenuation to audio signals appearing at emitter 64, thus eliminating undesired A.C. feedback along the D.C. feedback path.

The amplifier shown in FIGURE 2 is very similar to that of FIGURE 1 except for the omission of the by-pass capacitor in the emitter circuit of the NPN transistor. Because of the fact that the circuits are almost identical, similar numerals have been applied to corresponding components and the operation, except as set forth below, may be considered to be substantially the same as in the device of FIGURE 1.

The bias for the NPN transistor 40 is set by means of the bleeder resistor 46 in conjunction with resistors 42′ and 50. With the elimination of the capacitor across resistor 42′, there is a significant sacrifice in minimum gain. To reduce this gain loss, resistor 42′ is reduced in value from 270 ohms, which would be typical of the FIGURE 1 circuit, to a much lower value such as 47 ohms, which provides an increase in the D.C. loop gain. The value chosen for resistor 42′ constitutes a compromise between an increased value which would provide lower A.C. gain, but better thermal stability, and a lower value which would improve the A.C. gain at the expense of poorer thermal stability.

While only two embodiments have been shown and described herein, modifications will occur to those skilled in the art which may be incorporated without departing from the spirit and scope of the invention.

We claim:

1. An amplifier for use with a direct current power source having a substantial undesirable alternating current component comprising a first PNP transistor, a second NPN transistor direct coupled to said first transistor, and a third PNP transistor direct coupled to said second transistor, a self-heating resistor having a positive temperature coefficient connected between said power source and a terminal connected to the emitter of said first transistor, a thermistor connected between said terminal and the base circuit of said first transistor, a resistor connected between said terminal and the emitter of said third transistor, a first capacitor and a second capacitor connected between opposite sides of said last named resistor and ground, a second resistor connected between the emitter of said third transistor and the emitter of said second transistor, a third resistor connected between said second transistor emitter and ground and a third capacitor bypassing said third resistor, an input circuit connected between the base and the emitter of said third transistor, a fourth resistor connected to the base of said third transistor and a fourth capacitor connected to the emitter of said third transistor, said fourth resistor and fourth capacitor being connected together at a junction at their opposite terminals, a fifth resistor connected between said source and said junction, a sixth resistor connected between said junction and ground, a bias resistor connected between the base of said second transistor and ground, load means connected between the collector of said first transistor and ground, and feedback means including resistance means connected between said load means and the base of said third transistor.

2. An amplifier including first, second, and third cascaded direct-coupled transistors, said first and third transistors being PNP types and said second transistor being an NPN type, a direct current power source for said transistors, a self-heating, positive temperature coefficient resistor connected between said source and a terminal connected to the emitter of said first transistor, a first resistor connected between said terminal and the emitter of said third transistor, a first capacitor connected between said terminal and ground, a thermistor connected between said terminal and the base circuit of said first transistor, a second capacitor connected between the emitter of said third transistor and ground, a pair of bias resistors connected in series between said source and the base of said third transistor and a third bias resistor connected between the junction of said resistors and ground, a third capacitor connected between said junction and the emitter of said third transistor, a bleeder resistor connected between the emitter of said third transistor and the emitter of said second transistor, a resistor connected between the emitter of said second transistor and ground, a current limiting resistor connected between the collector of said second transistor and the base of said first transistor, load means connected between the collector of said first transistor and ground, and a feedback circuit including resistance means connected between said load means and the base of said third transistor.

References Cited by the Examiner

UNITED STATES PATENTS

| | | | |
|---|---|---|---|
| 2,964,713 | 12/60 | Shepard | 330—143 X |
| 3,005,958 | 10/61 | Grant | 330—19 |
| 3,018,444 | 1/62 | Offner | 330—28 X |
| 3,028,473 | 4/62 | Dyer et al. | |
| 3,110,869 | 11/63 | Smith-Vaniz et al. | 330—22 X |

ROY LAKE, *Primary Examiner.*

ARTHUR GAUSS, NATHAN KAUFMAN, *Examiners.*